United States Patent
Tedgue Beltrao et al.

(10) Patent No.: US 12,465,234 B2
(45) Date of Patent: Nov. 11, 2025

(54) METHOD AND SYSTEM FOR CONTACTLESS VITAL SIGN MONITORING VIA CALCULATING DISPLACEMENT SIGNAL BY APPLYING ADAPTIVE NONLINEAR LEAST SQUARES METHOD

(71) Applicants: IEE INTERNATIONAL ELECTRONICS & ENGINEERING S.A., Luxembourg (LU); UNIVERSITE DU LUXEMBOURG, Luxembourg (LU)

(72) Inventors: Gabriel Tedgue Beltrao, Belvaux (LU); Wallace Alves Martins, Auzeville-Tolosane (FR); Bhavani Shankar Mysore Rama Rao, Luxembourg (LU); Mohammad Alaeekerahroodi, Luxembourg (LU); Udo Schröder, Föhren (FR); Dimitri Tatarinov, Trier (DE)

(73) Assignees: IEE INTERNATIONAL ELECTRONICS & ENGINEERING S.A., Echternach (LU); UNIVERSITÉ DU LUXEMBOURG, Luxembourg (LU)

(*) Notice: Subject to any disclaimer, the term of this patent is extended or adjusted under 35 U.S.C. 154(b) by 0 days.

(21) Appl. No.: 18/879,775

(22) PCT Filed: Jun. 27, 2023

(86) PCT No.: PCT/EP2023/067534
§ 371 (c)(1),
(2) Date: Dec. 29, 2024

(87) PCT Pub. No.: WO2024/003086
PCT Pub. Date: Jan. 4, 2024

(65) Prior Publication Data
US 2025/0160671 A1    May 22, 2025

(30) Foreign Application Priority Data

Jun. 30, 2022 (LU) .......................... 502427
Nov. 24, 2022 (LU) .......................... 503103

(51) Int. Cl.
*A61B 5/05*    (2021.01)
*A61B 5/00*    (2006.01)
(Continued)

(52) U.S. Cl.
CPC .............. *A61B 5/05* (2013.01); *A61B 5/0245* (2013.01); *A61B 5/1126* (2013.01); *A61B 5/113* (2013.01);
(Continued)

(58) Field of Classification Search
CPC ....... A61B 5/05; A61B 5/0245; A61B 5/1126; A61B 5/113; A61B 5/7228; A61B 5/725; A61B 5/7257; A61B 5/7275
See application file for complete search history.

(56) References Cited

U.S. PATENT DOCUMENTS

| | | | |
|---|---|---|---|
| 2010/0152600 A1* | 6/2010 | Droitcour | A61B 5/7221 600/534 |
| 2021/0197834 A1* | 7/2021 | Shaker | G01S 7/354 |

OTHER PUBLICATIONS

Khan et al (An Overview of Signal Processing Techniques for Remote Health Monitoring Using Impulse Radio UWB Transceiver, Sensors (Basel). Apr. 27, 2020;20(9):2479).*

(Continued)

*Primary Examiner* — Serkan Akar
(74) *Attorney, Agent, or Firm* — Reising Ethington P.C.

(57) ABSTRACT

A method for vital sign monitoring using a radar sensor system that includes a transmitter, a receiver, and processing device. The transmitter irradiates a body region of a person with radar radiation, the receiver generates a receiver signal from reflected radiation from the body region, and the (Continued)

processing device generates, for each of a plurality of processing windows, a displacement signal based on the receiver signal. The displacement signal characterizes a body motion having, as oscillating motions, a breathing motion and a heartbeat motion, and calculates an estimated fundamental frequency for at least one oscillating motion. The processing device applies an adaptive Nonlinear Least Squares method to calculate a plurality of frequency estimates, each of which corresponds to one of a plurality of harmonics of a first oscillating motion, wherein the processing device calculates a first estimated fundamental frequency for the first oscillating motion based on the frequency estimates.

13 Claims, 4 Drawing Sheets

(51) Int. Cl.
    *A61B 5/0245*     (2006.01)
    *A61B 5/11*     (2006.01)
    *A61B 5/113*     (2006.01)

(52) U.S. Cl.
    CPC ............ *A61B 5/7228* (2013.01); *A61B 5/725* (2013.01); *A61B 5/7257* (2013.01); *A61B 5/7275* (2013.01)

(56) References Cited

OTHER PUBLICATIONS

Zhang et al (Estimation of Human Body Vital Signs Based on 60 GHz Doppler Radar Using a Bound-Constrained Optimization Algorithm, Sensors (Basel). Jul. 12, 2018;18(7):2254).*
Khan Radar Health (Year: 2020).*
Zhang Radar Vital Signs (Year: 2020).*
Beltrao et al., "Contactless radar-based breathing monitoring of premature infants in the neonatal intensive care unit", Scientific reports, Mar. 25, 2022, XP055944708, England.
Wenyu et al., "Non-contact monitoring of human heartbeat signals using mm-wave frequency-modulated continuous-wave radar under low signal-to-noise ratio conditions", IET Radar Sonar Navigation, the Institution of Engineering and Technology, UK, vol. 16, No. 3, Nov. 22, 2021, pp. 456-469.
International Search Report corresponding to application PCT/EP2023/067534, dated Aug. 18, 2023, 3 pages.
Written Opinion corresponding to application PCT/EP2023/067534, dated Aug. 18, 2023, 5 pages.
Park et al., "Arctangent demodulation with DC offset compensation in quadrature Doppler radar receiver systems," IEEE Transactions on Microwave Theory and Techniques, vol. 55, No. 5, pp. 1073-1078, 2007.
LV et al., "Doppler Vital Signs Detection in the Presence of Large-Scale Random Body Movements," IEEE Transactions on Microwave Theory and Techniques, vol. 66, No. 9, pp. 4261-4270, 2018.
Rong et al., "Remote Sensing for Vital Information Based on Spectral-Domain Harmonic Signatures," IEEE Transactions on Aerospace and Electronic Systems, vol. 55, No. 6, pp. 3454-3465, 2019.
Beltrão et al., "Contactless radar-based breathing monitoring of premature infants in the neonatal intensive care unit," Scientific Reports, vol. 12, No. 1, pp. 1-15, 2022.
Sun et al., "Remote Measurement of Human Vital Signs Based on Joint-Range Adaptive Eemd," IEEE Access, vol. 8, pp. 68 514-68 524, 2020.

* cited by examiner (c)

METHOD AND SYSTEM FOR CONTACTLESS VITAL SIGN MONITORING VIA CALCULATING DISPLACEMENT SIGNAL BY APPLYING ADAPTIVE NONLINEAR LEAST SQUARES METHOD

TECHNICAL FIELD

The present invention relates method and a system for contactless vital sign monitoring.

BACKGROUND

Continuous monitoring of vital signs plays a crucial role in the early detection of conditions that affect the well-being of a patient. The most important vital signs are the respiratory rate and the heart rate. These are critical physiological parameters, and by continuously monitoring of these it is possible to detect various abnormal states like drowsiness, sleep apnea, and even depression. However, conventional monitoring devices, usually connected by cables, restrict the mobility of the patient, may cause discomfort, and even lead to epidermal damage. Therefore, these are rather inadequate for long-term monitoring.

On the other hand, it is possible to monitor vital signs by radar-based devices. This contactless monitoring provides several advantages over standard devices. Unlike cameras, radar signals can penetrate through different materials and are not affected by skin pigmentation or ambient light levels. Unlike wearable sensors, radar systems do not require users to wear or carry any additional equipment. In addition, radar devices preserve privacy, and can be operated at low power and low cost.

However, despite recent advances, accurate vital sign monitoring is still challenging in practical scenarios, especially in relation to the heart rate estimation. Radar-based vital sign processing relies on a phase analysis of a backscattered signal, which corresponds to the chest-wall displacement induced by the breathing and the heartbeat mechanisms. The recovered displacement signal usually contains not only the breathing and heartbeat fundamental frequencies, but also their associated upper harmonics. Regarding their respective amplitudes, the heartbeat motion is typically several times smaller than the breathing motion. Also, the heartbeat fundamental frequency can be similar to upper harmonics of the breathing frequency. For these reasons, the heartbeat signal can be easily buried in the background noise or masked by higher-order harmonics of the breathing signal. Furthermore, additional frequency components and intermodulation products may also be present in the recovered signal, originated from different sources including radar non-linearities, phase-demodulation issues (see B. K. Park, O. Boric-Lubecke, and V. M. Lubecke, "Arctangent demodulation with DC offset compensation in quadrature Doppler radar receiver systems," IEEE Transactions on Microwave Theory and Techniques, vol. 55, no. 5, pp. 1073-1078, 2007), and random body movements from the monitored subject (see Q. Lv, L. Chen, K. An, J. Wang, H. Li, D. Ye, J. Huangfu, C. Li, and L. Ran, "Doppler Vital Signs Detection in the Presence of Large-Scale Random Body Movements," IEEE Transactions on Microwave Theory and Techniques, vol. 66, no. 9, pp. 4261-4270, 2018). These interfering elements can be dominant in the neighbourhood of the heartbeat fundamental frequency, often preventing detection and hindering heart rate estimation.

The harmonic interference from breathing in the heartbeat signal has been extensively reported as one of the main issues in radar-based vital sign monitoring. While breathing estimation is usually only limited by noise, the spectral region containing the fundamental frequency of the heartbeat is mainly dominated by higher harmonics of the breathing motion. In this way, spectral overlaps may occur and the heartbeat peak may eventually be masked by breathing harmonics. Depending on signal-to-interference ratio (SIR), and the specific combination of fundamental breathing/heartbeat frequencies, most techniques fail to provide robust and accurate heart rate estimation.

To avoid this interference, an approach based on the concept of harmonics-based heart rate estimation has been proposed (see Y. Rong and D. W. Bliss, "Remote Sensing for Vital Information Based on Spectral-Domain Harmonic Signatures," IEEE Transactions on Aerospace and Electronic Systems, vol. 55, no. 6, pp. 3454-3465, 2019). While the fundamental heartbeat frequency is respiration-interference-limited, its higher-order harmonics are noise-limited. In this approach, the spectrum is generated using the conventional discrete Fourier transform (DFT) and estimation is performed mostly using the second harmonic of the heartbeat signal. The first harmonic is only used when the primary estimate fluctuates wildly. However, this method has some limitations. A relatively high signal-to-noise ratio (SNR) is required in order to detect the second-order harmonics of the heartbeat signal, and the tracking performance is very sensitive to background noise and random body motion. Because of these limitations, it only works when the monitored subject is seated completely static, and at no more than 80 cm away from the radar.

For improving the SNR for estimation, Beltrão et al. have proposed a nonlinear least squares (NLS) approach for breathing rate monitoring (see G. Beltrão, R. Stutz, F. Hornberger, W. A. Martins, D. Tatarinov, M. Alaee-Kerahroodi, U. Lindner, L. Stock, E. Kaiser, S. Goedicke-Fritz, U. Schroeder, B. S. M. R., and M. Zemlin, "Contactless radar-based breathing monitoring of premature infants in the neonatal intensive care unit," Scientific Reports, vol. 12, no. 1, pp. 1-15, 2022). It uses an initial (coarse) estimate as a reference for the NLS search region, which is limited around this estimate. This initial estimate is obtained using an additional algorithm, applied directly over the time-domain signal. However, the NLS estimation performance can be affected by the nonlinear objective function, with multiple peaks, and a very sharp global maximum. Hence, finding the fundamental frequencies by a search algorithm requires accurate initialization. In addition, some of the assumptions made by Beltrão et al. may not hold in specific cases, especially considering heart rate estimation. Particularly, it is not always possible to guarantee that the frequency components in the NLS spectrum are distinct and well separated.

When operating at higher frequencies, with larger bandwidth, the radar range resolution can be smaller than a few centimeters. Under these conditions, the human body is an extended target, and its energy may spread across adjacent range bins. This effect was reported by Sun et al. (see L. Sun, S. Huang, Y. Li, C. Gu, H. Pan, H. Hong, and X. Zhu, "Remote Measurement of Human Vital Signs Based on Joint-Range Adaptive EEMD," IEEE Access, vol. 8, pp. 68 514-68 524, 2020), who noticed that the power of physiological movement from different parts of the human body will not concentrate at one range bin, but within several sequential bins. In this case, if using data from only one range bin, the performance will degrade due to the loss of signal power. To overcome this issue, SUN ET AL. propose to independently process each range bin individually and finally combine several of the separated heartbeat components for subsequent frequency estimation. Despite promising results, this method increases the computational complexity of the system due to the necessity of processing several range bins independently. In addition, the performance is still limited by the residual energy in each range bin.

SUMMARY

It is an object of the present invention to provide reliable and efficient means for life sign monitoring. The object is achieved by a method and system according to the claims.

The present invention provides a method for life sign monitoring using a radar sensor system, the radar sensor system comprising a transmitter, a receiver and a processing device.

Although the transmitter and the receiver are at least partially distinct, separate components, an antenna of the radar sensor system may be used by the transmitter (as a transmitting antenna) as well as by the receiver (as a receiving antenna). The processing device comprises hardware components but some of its functionalities may be realised by software. The processing device may also comprise any kind of volatile or non-volatile memory device. Normally, the processing device is connected to the receiver by a wired connection. It may also be connected to the transmitter in order to monitor and/or control the operation of the transmitter. The processing device may comprise a plurality of components or modules which may be disposed next to each other or at a distance from each other while being connected for information transmission and/or power transmission.

According to the method, the transmitter irradiates at least one body region of a person with radar radiation. As implied by the term "radar", the radiation is an electromagnetic wave. This electromagnetic wave may comprise one frequency or a plurality of frequencies, which at least one frequency is preferably between 1 GHz and 300 GHz. The radiation could be a continuous wave (CW), a phase-modulated continuous wave (PMCW), a frequency-modulated continuous wave (FMCW), an ultra-wideband wave (UWB) or another suitable waveform. The radiation from the transmitter irradiates at least one body region of a person. This may in particular be a chest region or a region that comprises a chest region (e.g., the entire torso). Normally, the skin of the person should be irradiated, so that either the body region should be exposed or any clothing should be largely transparent for the radiation. The person may be an adult or an infant. Since this method is a non-contact method, it can be used for any kind of person, including children, without leading to any disturbance, irritation or epidermal damage. While some transmission through the person's body or absorption by the body may occur, a major part of the radiation is reflected by the irradiated body region.

The receiver generates a receiver signal from reflected radiation from the at least one body region. The reflected radiation may be a superposition of radiation reflected by different body regions and/or different parts of a single body region. It is preferred that one and the same antenna is used by the transmitter to transmit radiation and by the receiver to receive reflected radiation. However, different antennas could be used for the transmitter and the receiver. The receiver signal, as a rule, is an electrical signal generated by the receiver due to the reflected radiation, or rather that portion of the reflected radiation that reaches the antenna of the receiver. Optionally, the receiver may perform operations like demodulation or amplification to generate the receiver signal.

The processing device generates, for each of a plurality of processing windows, a displacement signal based on the receiver signal, which displacement signal characterizes a body motion comprising as oscillating motions a breathing motion and a heartbeat motion, and calculating an estimated fundamental frequency for at least one oscillating motion. The displacement signal is normally a time-varying signal. It characterises or represents a body motion, e.g. a chest-wall motion. For instance, it may be proportional to the body motion, apart from noise and/or contributions from other sources. However, the relation between the body motion and the displacement signal could be different and possibly more complex. The body motion comprises at least two oscillating motions, namely a breathing motion and a heartbeat motion. Each oscillating motion may in particular be a quasi-periodic motion or an almost periodic motion. As a rule, the body motion is a superposition of the breathing motion at the heartbeat motion, and possibly additional motions, like random body movements. There may be other oscillating motions, e.g., if the person has a tremor. The processing device may use various techniques to generate the displacement signal, some of which will be discussed below. The processing window is a time window or time interval. The processing device performs the operations described herein not only for a single processing window but for a sequence of processing windows. Two consecutive processing windows may follow each other immediately, but there could also be a time in between, like a "dead time". It is also conceivable that there is an overlap between two processing windows, so that window "A" starts, and window "B" starts thereafter, but before window "A" ends. Furthermore, for each processing window, the processing device calculates an estimated fundamental frequency for at least one oscillating motion. Preferably, the processing device calculates an estimated fundamental frequency for the heartbeat motion and one for the breathing motion. Since these motions are oscillating, and usually quasi-periodic, they can be characterised by a fundamental frequency, at least within the limits of the processing window. It will be understood that none of these motions is truly sinusoidal, wherefore it can be characterised by the fundamental frequency plus higher harmonics, i.e., a second, third, fourth harmonic and so on. Here and in the following, the terms "fundamental frequency" and "first harmonic" are synonymous. The estimated fundamental frequency is calculated by the processing device and may deviate from the real fundamental frequency, wherefore the term "estimated" is used, indicating the possibility of a deviation. However, it should be noted that the inventive method has proven to be reliable and generally leads to a high degree of accuracy.

According to an aspect of the invention, the processing device, based on the displacement signal, applies an adaptive Nonlinear Least Squares method to calculate a plurality of frequency estimates, each of which corresponds to one of a plurality of harmonics of a first oscillating motion, wherein the processing device uses an individual search region for each frequency estimate, adapts at least one search region for at least one processing window, and calculates a first estimated fundamental frequency for the first oscillating motion based on the frequency estimates.

The first oscillating motion is one of the oscillating motions mentioned above, normally the heartbeat motion or the breathing motion, although this could also be e.g., an oscillating motion due to a tremor. The estimated fundamental frequency associated with this first oscillating motion is referred to as the "first estimated fundamental frequency". In order to find the first estimated fundamental frequency, the processing unit calculates a plurality of frequency estimates. These estimates correspond to different harmonics of the first oscillating motion. One could say that the processing unit identifies the frequencies of a plurality of harmonics, which frequencies are herein referred to as "frequency estimates". In other words, the processing unit not only tries to identify a single harmonic, e.g., the first harmonic or fundamental frequency, but a plurality of harmonics, which always includes at least one higher harmonic. Preferably, though, one of the harmonics is the fundamental frequency, i.e., one frequency estimate corresponds to the fundamental frequency as identified by the processing unit. The processing device applies an adaptive nonlinear least squares (NLS) method to determine the frequency estimates.

To be more specific, each frequency estimate is calculated individually using the adaptive NLS method. The processing device uses an individual search region for each frequency estimate. The search for the respective frequency estimate is limited to the search region, which helps to speed up the identification of the frequency estimate. The search region is a frequency region or frequency interval. There is one search region for each frequency estimate, i.e., one for each of the different harmonics. Usually, the search regions do not overlap, but this is not ruled out. The individual definition of the search regions is reasonable because lower harmonics will be found in other regions than higher harmonics. Further, the processing device adapts at least one search region for at least one processing window. In other words, at least one search region is not kept constant for every processing window, but is adapted. It is understood that information from a previous processing window can be used for the adaptation. Adapting the search region may refer to changing its lower boundary, its upper boundary, or both. It may refer to changing the size of the search region, i.e., making it smaller or larger, or to moving the search region to higher or lower frequencies without changing its size. Normally, every search region is adapted for every processing window. Since the processing unit adapts at least one search region, the NLS method is referred to as an "adaptive" NLS method. The frequency estimates can be regarded as "candidates" for the first estimated fundamental frequency, or for its higher harmonics, from which the fundamental frequency can be calculated in a trivial way. The first estimated fundamental frequency is then calculated by the processing unit based on these frequency estimates. "Calculate" is to be understood in a wide sense and may, e.g., refer to identifying one frequency estimate as the first estimated fundamental frequency.

Since this method uses frequency estimates corresponding to different harmonics, the chances for finding a reasonably accurate fundamental frequency are increased. Specifically, if one of the harmonics cannot be identified safely, it is possible this can be compensated by one of the other harmonics. This is especially true if one of the harmonics, like the fundamental frequency, is in proximity to at least one harmonic of another oscillating motion. Especially if the other harmonic has a similar or even larger amplitude, this may make a proper identification impossible. However, other harmonics, especially higher harmonics of the first oscillating motion, may be located in a region where there is no interference of another oscillating motion or where even higher harmonics of that oscillating motions are located, which generally have a much lower amplitude. Further, the definition and the dynamic adaptation of the individual search regions help to reduce the computational effort.

Preferably, the transmitter emits a radar radiation having a frequency between 50 GHz and 100 GHz. While the method is applicable to CW with a constant frequency, in other embodiments the frequency may be time-varying, e.g., when PMCW or FMCW is employed. In case of a FMCW, the centre frequency can be e.g., between 70 GHz and 90 GHz, and the bandwidth can be between 3 GHz and 10 GHz. However, other choices are possible. In the frequency range defined above, the wavelength is in the millimetre range. Within the range defined for the bandwidth, the range resolution is in the range of a few centimetres. The human body, even that of an infant, has to be regarded as an extended object under these conditions. The same applies, e.g., to the chest region. In other words, signals from different, distinguishable ranges may be relevant.

Preferably, at least three frequency estimates are calculated. In particular, these frequency estimates may correspond to the first harmonic (fundamental frequency), the second harmonic and the third harmonic. Accordingly, it is preferred that the processing device uses at least one search region for a fundamental frequency and at least one different search region for a higher harmonic. More specifically, it may use a first search region for the fundamental frequency and a second and third search region for two higher harmonics, e.g., for the second and third harmonic.

In particular, the first oscillating motion can be the heartbeat motion. The fundamental frequency of a typical heartbeat motion can be in the same frequency range as the second, third, fourth and/or fifth harmonic of the breathing motion. Accordingly, it may be difficult to properly identify the fundamental frequency und any conditions. The second and third harmonic of the heartbeat motion, on the other hand, are typically in the frequency range of the sixth harmonic and even higher harmonics, all of which are considerably weaker and usually do not interfere with the identification of the heartbeat harmonics.

There are various possibilities how the first estimated fundamental frequency can be based on the frequency estimates. For instance, it could be based on several frequency estimates, which are e.g., linearly combined. A weighting factor could be assigned to each of the frequency estimates, with the weighting factor representing a reliability or quality of the respective frequency estimate. Another embodiment provides that the processing device calculates the first estimated fundamental frequency so that it corresponds to one of the frequency estimates. If the frequency estimate is considered to be a fundamental frequency, then the first estimated fundamental frequency is set to be equal to this frequency estimate. If, on the other hand, the frequency estimate is considered to be an n-th harmonic, then the first estimated frequency is set to be equal to 1/n of the frequency estimate. This approach relies on the notion that only one frequency estimate can be accurate, and any inclusion of other frequency estimates would not improve the precision.

Preferably, the processing device generates an in-phase signal and a quadrature signal based on the receiver signal. As implied by the terms, the quadrature signal has a phase shift of 90° (or $\pi/2$) with respect to the in-phase signal. The wording "based on" includes the possibility that one of the in-phase signal and the quadrature signal is identical to the receiver signal. However, normally, the processing device performs some signal processing, e.g., mixing and/or filtering, to obtain the in-phase signal from the receiver signal. The quadrature signal is obtained by mixing with the 90°-shifted transmitted signal.

Preferably, the processing device performs an at least one-dimensional discrete Fourier transform based on the in-phase signal and the quadrature signal to obtain a slow-time signal for each of a plurality of position bins, each of the position bins corresponding to an at least one-dimensional position relative to the transmitter. Normally, the discrete Fourier transform (DFT) is at least performed regarding the range (i.e. the distance) from the transmitter, thus creating a plurality of range bins. Alternatively, normally additionally, a DFT as performed regarding the angle, thus creating a plurality of angle bins. As mentioned above, the range resolution of the radar sensor system may be a few centimetres, which then corresponds to the range interval represented by a range bin. Accordingly, the irradiated body region may extend over several range bins and/or angle bins.

Additionally, the processing device may perform a complex phase demodulation on the slow-time signal of each position bin to retrieve a single-bin displacement signal for the respective position bin. The single-bin displacement signal then represents the body motion in the respective position bin. However, it may also comprise a considerable amount of noise, i.e., the signal-to-noise ratio may be relatively low.

This problem can be alleviated in a preferred embodiment, according to which the processing device combines single-bin displacement signals from a plurality of position bins to obtain an aggregate displacement signal. As a rule, these are neighbouring position bins, i.e., they form a coherent group of position bins. For instance, the single-bin displacement signal of one range bin that is considered to correspond to the major part of the chest region could be combined with the signal of a neighbouring range bin, which is located on the far side of the first bin with respect to the transmitter. The same can be applied to different angle bins. The combination can take various forms. For example, the aggregate displacement signal can be some kind of linear combination of the single-bin displacement signals. In particular, the processing device can calculate the aggregate displacement signal by adding the single-bin displacement signals. If a specific oscillating motion is present in all of these single-bin displacement signals, a properly selected combination, e.g., an addition, enhances the SNR.

It would be conceivable to always combine the same single-bin displacement signals, e.g., in a situation where the relevant part of the body region can always be assumed to be a given position. However, in many applications it cannot be foreseen which position bins should be combined. Therefore, it is advantageous to dynamically or adaptively find the respective position bins. According to one such embodiment, the processing device combines the single-bin displacement signals depending on a correlation of these single-bin displacement signals. In other words, the processing device calculates a correlation of two single-bin displacement signals and the decision whether to combine these single-bin displacement signals depends on the correlation. Since any noise from different position bins is normally uncorrelated, it is reasonable to assume that the correlation is mainly enhanced by the body motion if parts of the body are located in both position bins. In this context, "correlation" is to be understood in a wide sense and it will be appreciated that various types of correlation could be used as a criterion. In particular, the Pearson correlation coefficient can be calculated. As known in the art, the Pearson correlation coefficient can assume a value between 0 (no correlation) and 1 (maximum correlation). A threshold value can be defined for the correlation, and if the correlation is above the threshold value, the single-bin signals are combined. There are other possibilities, though. For instance, the weight of a single-bin displacement signal could be chosen according to the correlation. In case of a Pearson correlation coefficient, the threshold is of course between 0 and 1, normally above 0.5. As a rule, the threshold is between 0.6 and 0.9.

Irrespective of whether single-bin displacement signals are combined or not, the processing unit can apply at least one bandpass filter to the (single-bin or aggregated) displacement signal. Although the signal quality can be improved by a universal bandpass filter, it is advantageous to apply a plurality of bandpass filters, namely one for each oscillating motion. This is because the relevant frequencies of the breathing motion are in a considerably lower frequency range than those of the heartbeat motion. By way of example, a suitable bandpass filter for the breathing motion can be permeable between 0.1 Hz and 3 Hz, while a suitable bandpass filter for the heartbeat motion can be permeable from 0.5 Hz to 5 Hz. This corresponds to the physiological range of the fundamental frequencies, including some of the higher harmonics. The bandpass filtered signals can then be used for calculating the fundamental frequencies in the following steps.

Preferably, the adaptive Nonlinear Least Squares method is based on minimization of a difference between the displacement signal and a model function with a plurality of harmonics for each of at least one oscillating motion. The model function can also be regarded as a (finite) Fourier series for at least one oscillating motion.

Strictly speaking, the model function should have one Fourier series with a fundamental frequency and at least one higher harmonic for each of the oscillating motions, i.e., one for the breathing motion and one for the heartbeat motion. In other words, the displacement signal d(t) can be modeled as a superposition of K sources, with $L_k$ harmonically related complex sinusoids for the $k^{th}$ source. The normalized angular frequency (in radians/sample) is related to the physiological frequency $f_k$ (in Hertz) as $$\omega_k = 2\pi \frac{f_k}{f_s},$$

where $f_s$ is the slow-time sampling frequency which is determined by the time between transmitted frames. After sampling, the model for the chest-wall displacement signal can be written as (see M. G. CHRISTENSEN AND A. JAKOBSSON, "Multi-pitch estimation," Synthesis Lectures on Speech & Audio Processing, vol. 5, no. 1, pp. 1-160, 2009):

$$d[n] = \sum_{k=1}^{K} d_k[n] = \sum_{k=1}^{K} \sum_{l=1}^{L_k} a_{k,l} e^{j\omega_k l n}, \qquad \text{(eq. 1)}$$

where $a_{k,l} = A_{k,l} e^{j\Phi_{k,l}}$ is the complex amplitude of the $l^{th}$ harmonic and n is the sample index. Now, let us consider a single source k, and define $d_k$, the vector consisting of N consecutive samples of $d_k[n]$, which can be expressed as $$d_k = Z_k a_k, \qquad \text{(eq. 2)}$$

with $a_k$ being the vector containing the complex amplitudes of the harmonics, and the matrix $z_k$ being defined as $$Z_k = [\, z(\omega_k) \; z(2\omega_k) \; \ldots \; z(L_k \omega_k) \,], \qquad (\text{eq. 3})$$

and $z(\omega)$ being the vector at frequency $\omega$. Using these definitions, the signal model can be rewritten as $$d = \sum_{k=1}^{K} Z_k a_k. \qquad (\text{eq. 4})$$

To obtain the frequency estimates, a set of fundamental frequencies has to be found that minimize the difference between the recovered displacement signal and the signal model. In this way, the NLS optimization problem can be expressed as $$\{\hat{\omega}_k\} = \arg\min_{\{a_k\},\{\omega_k\}} \left\| d - \sum_{k=1}^{K} Z_k a_k \right\|_2^2. \qquad (\text{eq. 5})$$

This problem is rather challenging and requires considerable computational effort. However, if the frequencies for one oscillating motion (i.e., all frequencies in $Z_k$) are distinct and well separated, it is possible to solve a minimisation problem for each oscillating motion individually as a good approximation of the general solution. The solution can be approximated by finding the fundamental frequency for each source, i.e., $$\hat{\omega}_k = \arg\min_{a_k,\omega_k} \| d - Z_k a_k \|_2^2. \qquad (\text{eq. 6})$$

The goal of the NLS method is then to find a fundamental frequency that (together with its corresponding higher harmonics) will minimise the difference between the model function and the displacement signal. It will be understood that this can be an aggregated and/or bandpass-filtered displacement signal. However, while the NLS method is based on minimisation of the difference, there are certain embodiments in which the difference does not have to be calculated explicitly, as will be explained below.

In a preferred embodiment, the processing device calculates at least one frequency of one oscillating motion using a cost function that is based on a Fast Fourier Transformation of the displacement signal. In particular, the cost function to be minimised can be the spectral density of the displacement signal. Under certain conditions, this is at least approximately equivalent to minimising the difference between the above-mentioned model function and the displacement signal. As shown by CHRISTENSEN ET AL., eq. 6 is equivalent to $$\hat{\omega}_k \approx \arg\max_{\omega_k} \hat{d}^H Z_k Z_k^H \hat{d} \qquad (\text{eq. 7})$$
$$\approx \arg\max_{\omega_k} \| Z_k^H \hat{d} \|_2^2.$$

This resulting cost function can be written as $$\sum_{i=1}^{L_k} \| z^H(\omega_k t) \hat{d} \|_2^2, \qquad (\text{eq. 8})$$

which is the periodogram power spectral density estimate of $\hat{d}$, evaluated at and summed over the harmonic frequencies $\omega_k l$, corresponding to an FFT. The frequency that is calculated in this embodiment can in particular be an estimated fundamental frequency or a frequency estimate. It will be appreciated that the use of a fast Fourier transformation (FFT) greatly helps to reduce the numerical burden, thus providing a result for the respective frequency quickly without the need of excessive computational power.

In one embodiment, the processing device uses an estimated fundamental frequency calculated in one processing window to define a search region for a frequency in a later processing window. In most scenarios, the fundamental frequency of the breathing motion as well as that of the heartbeat motion does not change abruptly from one processing window to the following processing window. Accordingly, the fundamental frequency in a consecutive processing window is mostly found near the estimated fundamental frequency that was calculated in the processing window before. Likewise, the positions of higher harmonics usually only change to a limited extent from one processing window to the next. Therefore, the search regions for the fundamental frequency as well as for the higher harmonics can be defined based on the previously found estimated fundamental frequency. This greatly helps to reduce the computational burden since the search region can be kept relatively narrow.

One embodiment provides that the processing device calculates, for at least one processing window, a predicted state comprising a predicted fundamental frequency that is based on at least one previous processing window and selects one frequency estimate as the estimated fundamental frequency depending on a comparison between the predicted fundamental frequency and the frequency estimate. The predicted state may comprise, apart from the predicted fundamental frequency, also a predicted first time derivative of the fundamental frequency and a predicted second time derivative. The latter two correspond to the "speed" and "acceleration" of a possible change of the fundamental frequency. In this case, a generic state vector can have the form $$x = [\, f_h \; f'_h \; f''_h \,]^T, \qquad (\text{eq. 9})$$

where $f_h$, $f'_h$, and $f''_h$ represent, respectively, the heartbeat fundamental frequency, its first time derivative and second time derivative. If the respective state for the previous processing window is known, the predicted state can be calculated if the time difference between the processing windows is also known. From a current state $\hat{x}_{m,m}$, at the $m^{th}$ processing window, a predicted state $\hat{x}_{m+1,m}$ can be calculated using the state transition equation, defined as $$\hat{x}_{m+1,m} = \begin{bmatrix} 1 & \Delta t & \frac{\Delta t}{2} \\ 0 & 1 & \Delta t \\ 0 & 0 & 1 \end{bmatrix} \hat{x}_{m,m} = F \hat{x}_{m,m}, \qquad (\text{eq. 10})$$

where F is the state transition matrix, with Δt being the time from one processing window to the next. The above equation corresponds to a constant acceleration model. The predicted state normally differs from the actual state in the respective processing window. However, for short time periods, the actual state can be expected to be at least close to the predicted state. Accordingly, the frequency estimate that is closest to the predicted fundamental frequency will usually be the most accurate one. Therefore, this frequency estimate can be selected as the estimated fundamental frequency. The other frequency estimates can be discarded. However, it is also possible to define another threshold (hereinafter also referred to as a gating threshold) for a distance between the predicted fundamental frequency and the frequency estimate. In this context, various types of distance can be used, in particular the Mahalanobis distance. If the distance is above the threshold, the respective frequency estimate is regarded as an outlier. In this case, the frequency estimate is discarded in any case. This may lead to all frequency estimates being discarded for the respective processing window. There may be various reasons for this, like excessive noise making a frequency identification impossible for the respective processing window. Also, the threshold may have been too small. Accordingly, the threshold can be increased for the next processing window. For this processing window, the estimated fundamental frequency can be set to be the predicted fundamental frequency.

Various techniques known in the art can be employed to determine the first estimated fundamental frequency on the basis of the frequency estimates. According to one embodiment, the processing device uses a Kalman filter to calculate the first estimated fundamental frequency. The Kalman filter is a recursive Bayesian algorithm which produces accurate estimates based on noisy or uncertain measurements. It updates its estimates and parameters sequentially as new data arrives. Therefore, it is suitable for real-time processing with the overlapped sliding windows approach commonly used for vital sign processing. In this context, one could also say that the Kalman filter is used to determine which of the frequency estimates is (or are) used as the basis for the first estimated fundamental frequency. As a rule, one frequency estimate is used, but it could also be two or more, which are then combined (e.g., in a weighted manner). In some cases, none of the (current) frequency estimates is used, if all estimates are discarded based on the Kalman filter. In case of three search regions and three frequency estimates $\hat{f}_{r1}$, $\hat{f}_{r2}$ and $\hat{f}_{r3}$ for the first, second and third harmonic, a measurement vector $y_h$ can be defined as $$y_h = \left[\hat{f}_{r1}, \frac{\hat{f}_{r2}}{2}, \frac{\hat{f}_{r3}}{3}\right]^T \quad (\text{eq. 11})$$

The state vector represents a Gaussian process with mean $\hat{x}_{m,m}$ and covariance $P_{m,m}$. The extrapolated covariance can be calculated as $$P_{m+1,m} = FP_{m,m}F^T + Q, \quad (\text{eq. 12})$$

where Q is related to the process noise uncertainty and can be modeled as $Q=gg^T\rho_{a^2}$, with $$g = [0.5\Delta t^2 \quad \Delta t \quad 1]^T, \quad (\text{eq. 13})$$

and $\rho_{a^2}$ representing the process noise. With the observation matrix $$H = \begin{bmatrix} 1 & 0 & 0 \\ 1 & 0 & 0 \\ 1 & 0 & 0 \end{bmatrix}. \quad (\text{eq. 14})$$

the measurement innovation (error) $e_m$ can be calculated as $$e_m = y_h - H\hat{x}_{m+1,m} \quad (\text{eq. 15})$$

Its associated covariance is given by $$S_m = HP_{m+1,m}H^T + R, \quad (\text{eq. 16})$$

with R being a diagonal matrix containing the uncertainty in the frequency estimates for each search region, i.e.

$$R = \begin{bmatrix} \sigma_{r1}^2 & 0 & 0 \\ 0 & \sigma_{r2}^2 & 0 \\ 0 & 0 & \sigma_{r3}^2 \end{bmatrix}. \quad (\text{eq. 17})$$

The algorithm can be initialized with predefined Q and R matrices, and initial state $\hat{x}_{0,0}$ with covariance $P_{0,0}$. If at least one of the frequency estimates is within the abovementioned gating threshold, the one which minimizes the distance between the new measurement and the predicted state is selected for the first estimated fundamental frequency. Subsequently, the state vector is updated as $$\hat{x}_{m+1,m+1} = \hat{x}_{m+1,m} + k_m e_m(j) \quad (\text{eq. 18})$$

where j is the index corresponding to the selected NLS estimate, with the Kalman gain $k_m$ being calculated as $$k_m = \frac{P_{m+1,m}h_j}{S_m(j,j)} \quad (\text{eq. 19})$$

where $h_j^T$ is the $j^{th}$ row of H and $S_m(j, j)$ is the $j^{th}$ diagonal element of $S_m$. Finally, the associated covariance $P_{m+1,m+1}$ is calculated as $$P_{m+1,m+1} = (I - k_m h_j^T)P_{m+1,m} \quad (\text{eq. 20})$$

in order to be used in the next filter iteration.

If none of the frequency estimates falls within the gate, all are discarded and the Kalman gain is then set to zero. If this condition holds during several adjacent processing windows, it may indicate that the state estimate has diverged. In this case, the updated covariance can be updated to its initial (large) value, in order to allow the filter to reacquire. The initially predefined Q and R matrices can be kept constant for each iteration. However, it is also possible that Q and/or R are adapted in each iteration.

The present invention also relates to a radar sensor system for life sign monitoring, comprising:

a transmitter for irradiating at least one body region of a person with radar radiation;

a receiver for generating a receiver signal from reflected radiation from the at least one body region; and a processing device adapted to generate, for each of a plurality of processing windows, a displacement signal based on the receiver signal, which displacement signal characterizes a body motion comprising as oscillating motions a breathing motion and a heartbeat motion, and to calculate an estimated fundamental frequency for at least one oscillating motion, wherein the processing device is adapted to apply, based on the displacement signal, an adaptive Nonlinear Least Squares method to calculate a plurality of frequency estimates, each of which corresponds to one of a plurality of harmonics of a first oscillating motion, wherein the processing device is adapted to use an individual search region for each frequency estimate, to adapt at least one search region for at least one processing window, and to calculate a first estimated fundamental frequency for the first oscillating motion based on the frequency estimates.

Embodiments of the radar sensor system correspond to those of the life sign monitoring method described above.

BRIEF DESCRIPTION OF THE DRAWINGS

Preferred embodiments of the invention will now be described, by way of example, with reference to the accompanying drawings, in which.

DETAILED DESCRIPTION

Figure 1:
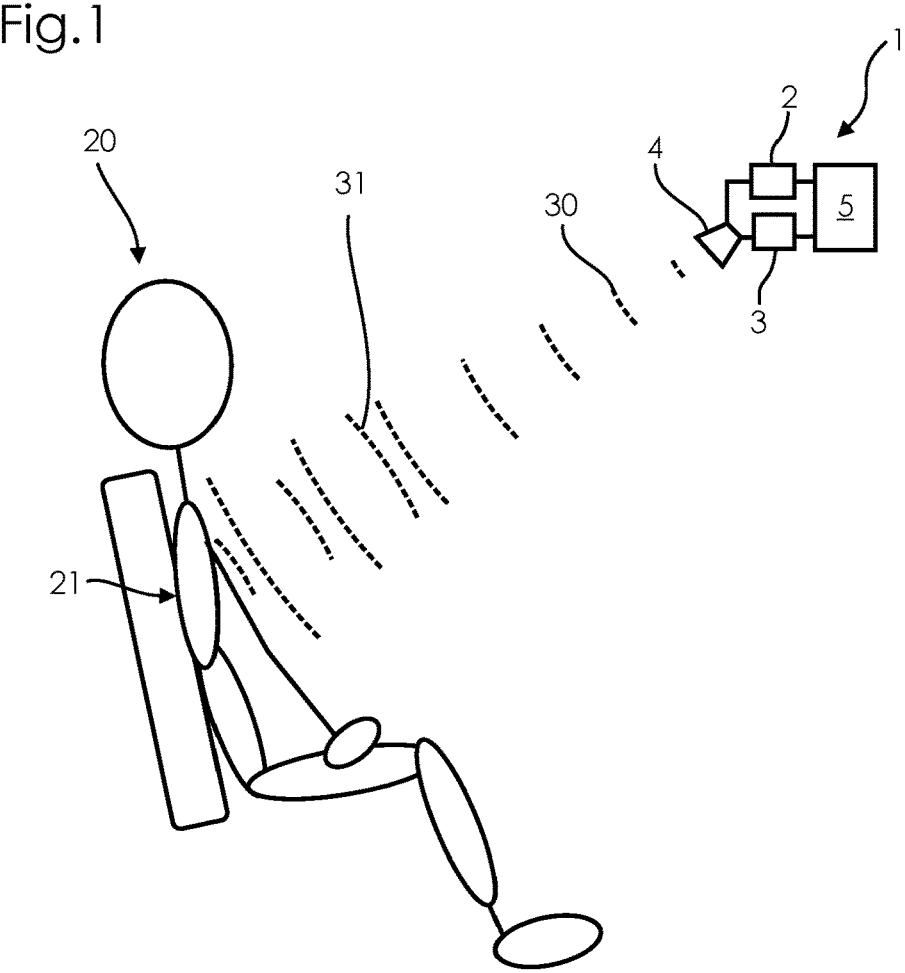
FIG. 1 shows a schematic representation of a first embodiment of a radar sensor system and a person.

FIG. 1 schematically shows a setup for a first embodiment of a method for life sign monitoring according to an embodiment of the present invention. A radar sensor system 1 for breathing monitoring, which is used in this method, comprises a transmitter 2 and a receiver 3, which are connected to a single antenna 4. In other words, the transmitter 2 uses the antenna 4 to transmit radar radiation 30 and the receiver 3 uses the same antenna 4 to receive reflected radar radiation 31. Both the transmitter 2 and the receiver 3 are connected to a processing device 5, which comprises hardware components, although some of its functionalities may be realised by software.

As shown in FIG. 1, a person 20 is positioned opposite the radar sensor system 1. The transmitter 2 irradiates a chest region 21 with a transmitted signal 30 of radar radiation. In this embodiment, the transmitted signal is a FMCW signal, but other signal types like PMCW or CW could be used as well. The transmitter 2 could operate at 77 GHz with a bandwidth of 4 GHz. The transmitted signal 30 is reflected by the chest region 21, whereby a reflected signal 31 is generated, which is then received by the receiver 3 via the antenna 4.

The receiver 3 generates a receiver signal from the reflected signal 11 from the chest region 21. The chest region 21 undergoes a body motion which comprises at least two oscillating motions, namely a breathing motion and a heartbeat motion. Other oscillating motions (e.g. due to a tremor) and/or non-oscillating motions may also be present.

Figure 2:
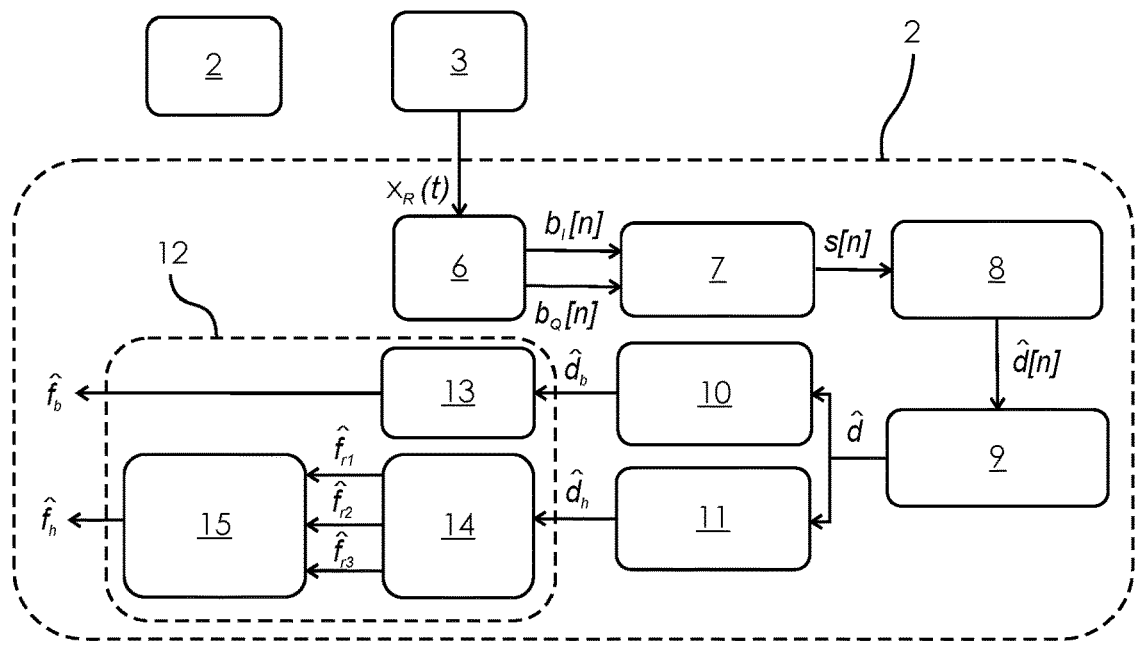
FIG. 2 is a block diagram illustrating various functions of the radar sensor system.
Figure 3:
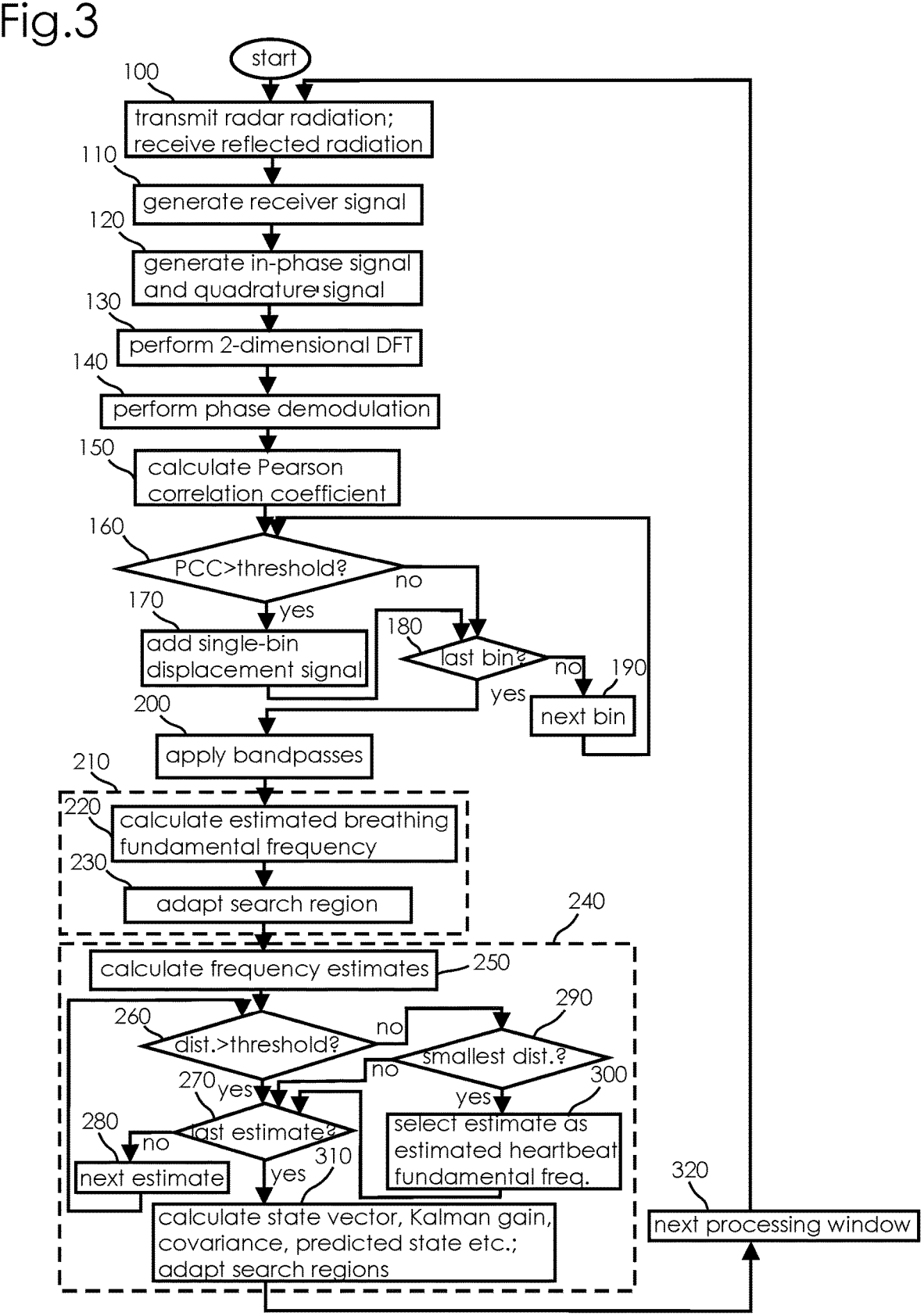
FIG. 3 is a flow chart illustrating an embodiment of a method for life sign monitoring.

FIG. 2 is a block diagram of the radar detection system 1, while FIG. 3 is flowchart illustrating an embodiment of the inventive method. After transmitting and receiving radiation in step 100, the receiver 3 generates a receiver signal (step 110), which is mixed with a replica of the transmitted signal and, after quadrature demodulation, it can be approximated as $$x_R(t) = A_R e^{j(2\pi f_b t + \Delta\theta(t) + \Delta\phi(t))}, \qquad \text{(eq. 21)}$$

where $A_R$ represents the received signal amplitude, $f_b$ is the beat frequency, $\Delta\phi(t)$ is the residual phase noise (usually neglected for short-range applications), and $\Delta\theta(t)$ is the time-varying phase due to the body motion. This receiver signal is then provided to an analog-to-digital converter (ADC) 6 of the processing device 5, which also generates an in-phase signal $b_I[n]$ and a quadrature signal $b_Q[n]$ (step 120) and transmits these to a pre-processor 7. In order to identify and extract the slow-time signal from the monitored person 20, at a specific range and angle position, a two-dimensional discrete Fourier transform (DFT) is applied over the radar data cube, across the range and angle dimensions (step 130). This results in signals for each of a plurality of range bins and angle bins. It should be noted that other preprocessing architectures could be used. For instance, such an architecture could use a two-dimensional DFT across range and Doppler, and estimating an angle later.

A phase demodulator 8 performs a complex phase demodulation (step 140) in that it combines the complex samples of the slow-time signal to recover the displacement signal containing the phase information related to the chest-wall movement over time. In this embodiment, the arctangent demodulation (AD) is used. The recovered single-bin displacement signal can thus be obtained as $$\hat{d}[n] = \frac{\lambda_c}{4\pi} \cdot \text{unwrap}\left(\arctan\left[\frac{\mathcal{I}(s[n])}{\mathcal{R}(s[n])}\right]\right) \qquad \text{(eq. 22)}$$

where s[n] represents the samples of the complex slow-time signal at a specific range bin, and $\lambda_C$ is the chirp starting wavelength of the FMCW signal. By using the unwrap operation, possible phase discontinuities caused by the bounded image of the arctangent function can be removed. Prior to the AD, possible DC offsets can be compensated by using, e.g., the Levenberg-Marquardt algorithm.

Due to the abovementioned frequency range of the transmitter 2, a range resolution of approximately 4 cm can be achieved. This enables not only to resolve closely spaced objects, but also to filter-out nearby interference. However, in these conditions, the body of the person 20 (and even the chest portion 21 as such) is an extended target and relevant single-bin displacement signals may spread across a several range bins. Given that belly and back may also be involved in the respiration/heartbeat movement, vital sign information may eventually be detected in these additional range bins.

Figure 4:
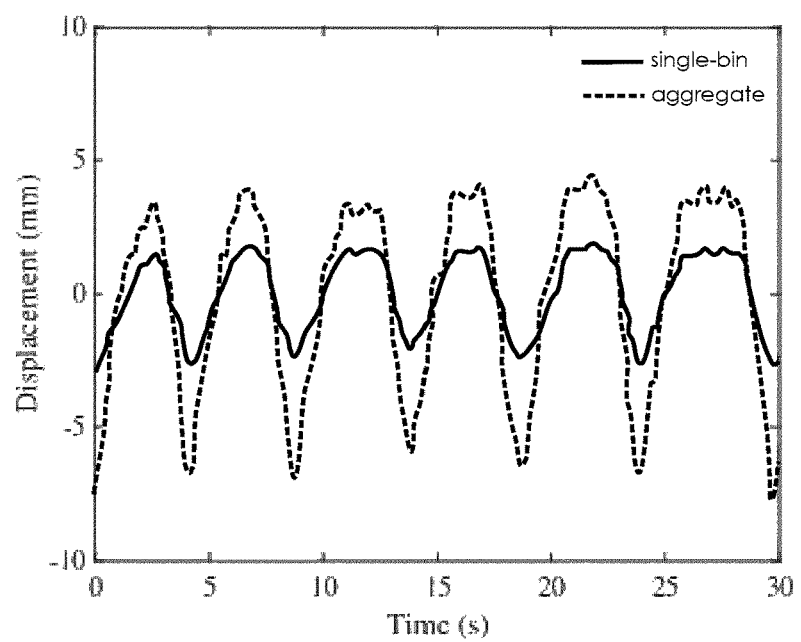
FIG. 4 is a diagram illustrating the time evolution of displacement signals.
Figure 5:
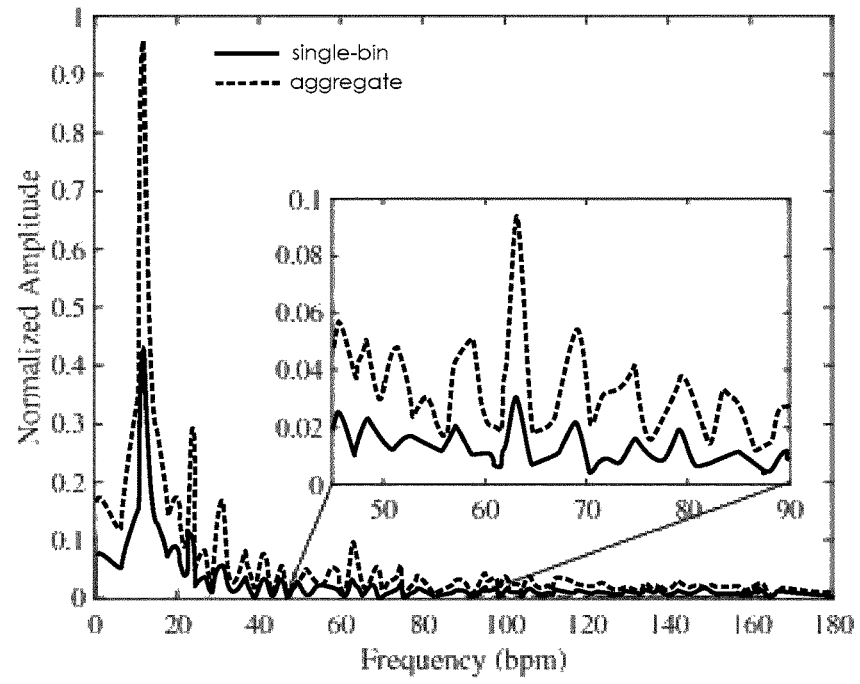
FIGS. 5-7 are diagrams showing frequency spectra.

To exploit this and improve the SNR before estimation, a correlator 9 of the processing unit 2 performs a slow-time phase correlation processing. The single-bin displacement signals of several range bins are combined, if the signals are well correlated. With reference to a "detection bin", which may e.g., correspond to the center of the chest wall, one can examine the correlation with the $i^{th}$ adjacent range bin and/or angle bin. Defining $\hat{d}_d$ and $\hat{d}_i$ as the vectors with the recovered displacement signals at the detected bin, and the $i^{th}$ adjacent range bin, the correlator 9 calculates (at 150) the Pearson correlation coefficient, given by $$\rho(\hat{d}_d, \hat{d}_1) = \frac{\text{cov}(\hat{d}_d, \hat{d}_1)}{\sigma_{\hat{d}_d} \sigma_{\hat{d}_1}} \quad \text{(eq. 23)}$$

where $\text{cov}(\hat{d}_d, \hat{d}_i)$ represents the covariance between these vectors, with $\sigma_{\hat{d}_d}$ and $\sigma_{\hat{d}_i}$ the corresponding standard deviations. At 160, it is checked whether the correlation coefficient exceeds a predetermined threshold (e.g., 0.8). If so, the single-bin displacement signals are added. This process is repeated through steps 180 and 190 for a given number of range bins. By summing up the sufficiently correlated single-bin displacement signals, an aggregate displacement signal is calculated. FIG. 4 shows, by way of example, a comparison of the single-bin displacement signal and the resulting aggregate displacement signal. It can be seen how the displacement amplitude increased as the SNR is improved, while the periodicity remains the same. FIG. 5 shows the corresponding frequency spectrum, which also confirms that the main frequency content is preserved.

For removing any residual DC values, and possible high frequency noise components, the aggregate displacement signal is filtered (step 200) using two bandpass filters 10, 11, one with a bandpass Kaiser window ($\beta$=6.5), from 0.1 Hz to 3 Hz (6-180 breaths/minute) for the breathing motion, and 0.5 Hz to 5 Hz (30-300 beats/minute) for the heartbeat motion. This corresponds to the physiological range of fundamental frequencies (first harmonics), including a few higher harmonics. The bandpass filtered signals $\hat{d}_b$ and $\hat{d}_h$ can be a good approximation of the true chest-wall motion and can finally be used for frequency estimation, which is performed by an ANLS (adaptive Nonlinear-Least-Squares) module 12 of the processing device 5. This ANLS module 12 comprises a breathing-frequency estimator 13, a heartbeat-frequency estimator 14 and a frequency selector 15. It should be understood that the elements 13-15 of the ANLS module 12 are usually software-implemented and are therefore physically not distinct.

Using the model function of eq. 1, the breathing-frequency estimator 13 as well as the heartbeat-frequency estimator 14 solve the NLS problem by maximising the cost function $$\sum_{l=1}^{L_k} \|z^H(\omega_k l)\hat{d}\|_2^2 \quad \text{(eq. 8)}$$

which is the periodogram power spectral density estimate of $\hat{d}$, evaluated at and summed over the harmonic frequencies $\omega_k l$. Therefore, both estimators 13, 14 are efficiently implemented using an FFT algorithm.

For determining the breathing fundamental frequency, a search region $A_b$ is defined in order to reduce the search time. For the first processing window, the search region is initialized so that it comprises the entire physiological breathing range. When the estimated breathing fundamental frequency has been calculated in step 220, the search region can be adapted in step 230. For any following processing window, the estimated breathing fundamental frequency of the previous processing window is used to define the search region $A_b$, which can be narrower than for the first processing window. This approach makes sense due to the relatively slow variation of the breathing rate over time. Accordingly, the search region is thus limited around a reference value, and it will adaptively change according to the breathing rate variation over time. Steps 220 and 230 constitute an ANLS breathing-frequency estimation 210, which is performed by the breathing-frequency estimator 13.

The estimated heartbeat fundamental frequency is calculated in an ANLS heartbeat-frequency estimation 240, which is performed by the heartbeat-frequency estimator 14 and the frequency selector 15. Although the ANLS heartbeat-frequency estimation 240 is shown as being performed after the ANLS breathing-frequency estimation 210, the sequence could be inverted or both estimations 210, 240 could be performed at the same time.

Figure 6:
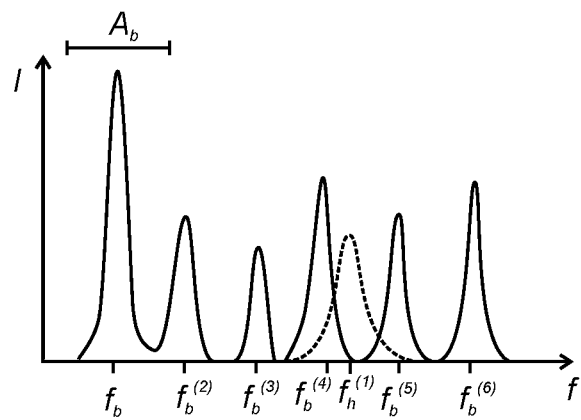

For the heartbeat fundamental frequency, the ANLS heartbeat-frequency estimator 14 calculates three different frequency estimates $f_{r1}, f_{r2}, f_{r3}$ (in step 250), which correspond to the first harmonic $f_h^{(1)}$ (i.e. the fundamental frequency $f_h$), the second harmonic $f_h^{(2)}$ and the third harmonic $f_h^{(3)}$. As visualized in FIGS. 6 and 7, the fundamental heartbeat frequency $f_h^{(1)}$ "competes" with the third, fourth, and fifth harmonics of the breathing motion $f_b^{(3)}$-$f_b^{(5)}$, which are relatively strong. On the other hand, the second and third heartbeat harmonics $f_h^{(2)}, f_h^{(3)}$, share their spectral location with strongly attenuated seventh, eighth and ninth order breathing harmonics $f_b^{(7)}$-$f_b^{(9)}$. Including the second and third heartbeat harmonics can therefore significantly improve the calculation of the estimated heartbeat fundamental frequency. However, as the amplitude of these harmonics depends on specific characteristics of the breathing and heartbeat motion, as well as on many other processing parameters, one cannot be sure these higher-order heartbeat harmonics will always be detectable. Therefore, the conventional estimation based on the heartbeat fundamental frequency is still helpful.

Figure 7:
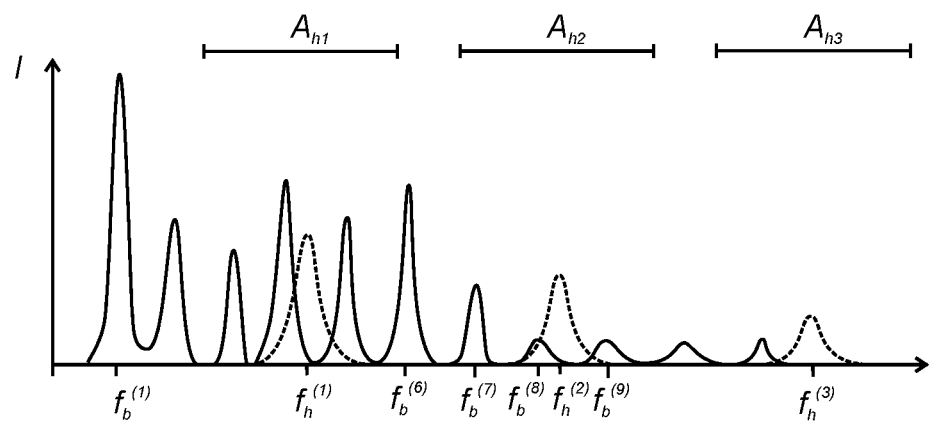

As illustrated in FIG. 7 one search region $A_{h1}$-$A_{h3}$ is defined for each heartbeat harmonic. The search regions can be chosen to be separated, because, for a healthy person 20 at rest, the physiological range of the heart rate usually goes from 50 bpm to 90 bpm. Accordingly, the first search region $A_{h1}$ can be defined by these values, the second search region $A_{h2}$ can be defined from 100 bpm and up to 180 bpm and the third search region $A_{h3}$ can also be defined from 150 bpm to 270 bpm.

When the frequency estimates $f_{r1}, f_{r2}, f_{r3}$ have been calculated, they are provided to the frequency selector 15, which applies a Kalman filter as outlined above with reference to eqs. 9-20. The frequency selector 15 checks, in step 260, whether a distance (e.g., the Mahalanobis distance, but a different distance definition could be used) between the respective estimate and a predicted frequency is above a certain gating threshold. If so, the frequency estimate is discarded and, if it is not found in step 270 to be the last (i.e. the "third") estimate, the next estimate is selected in step 280. If the distance is not above the threshold, it is checked in step 290 if it is the smallest distance so far, i.e. if this frequency estimate is closest to the predicted frequency. If so, it is selected, in step 300, as the estimated heartbeat fundamental frequency $f_h$ (until possibly another frequency estimate is closer to the predicted frequency). The fundamental frequencies $f_b, f_h$ can e.g. be provided to a display (not shown).

In step 310, the state vector $\hat{x}_{m+1,m+1}$ is updated, the Kalman gain $k_m$ and the associated covariance $P_{m+1,m+1}$ are calculated according to eqs. 18-20, although other variants of the Kalman equations could also be used. Also, a new predicted state can be calculated, thus making it possible to adapt the search regions for the next processing window, which is entered at step 320, before the method returns to step 100. If none of the frequency estimates fall within the gate, i.e., all of them are discarded, the Kalman gain is then set to zero and the final estimate is only based on the predicted state. If this condition holds during several adjacent processing windows, it may indicate that the state estimate has diverged. In this case, the updated covariance is reset to its initial (large) value, in order to allow the filter to reacquire.

The invention claimed is:

1. A method for vital sign monitoring using a radar sensor system,
the radar sensor system comprising a transmitter, a receiver and processing device, wherein:
the transmitter irradiates at least one body region of an object with radar radiation;
the receiver generates a receiver signal from reflected radiation from the at least one body
region; and
the processing device generates, for each of a plurality of processing windows that represent time intervals, a displacement signal based on the receiver signal, which displacement signal characterizes a body motion comprising, as oscillating motions, a breathing motion and a heartbeat motion, and calculates an estimated fundamental frequency for at least one oscillating motion,
wherein the processing device combines single-bin displacement signals from a plurality of position bins, depending on a correlation of these single-bin displacement signals, to obtain an aggregate displacement signal, wherein the processing device, based on the aggregate displacement signal, applies an adaptive Nonlinear Least Squares method to calculate a plurality of frequency estimates, each of which corresponds to one of a plurality of harmonics of a first oscillating motion, and wherein the processing device uses an individual search region for each frequency estimate, adapts at least one search region for at least one processing window, and calculates a first estimated fundamental frequency for the first oscillating motion based on the frequency estimates wherein at least one of the breathing motion or the heartbeat motion of the object is monitored.

2. The method according to claim 1, wherein the processing device uses at least one search region for a fundamental frequency and at least one different search region for a higher harmonic.

3. The method according to claim 1, wherein the first oscillating motion is the heartbeat motion.

4. The method according to claim 1, wherein the processing device calculates the first estimated fundamental frequency so that it corresponds to one of the frequency estimates.

5. The method according to claim 1, wherein the processing device generates an in-phase signal and a quadrature signal based on the receiver signal.

6. The method according to claim 1, wherein the processing device performs an at least one-dimensional discrete Fourier transform based on the in-phase signal and the quadrature signal to obtain a slow-time signal for each of a plurality of position bins, each of the position bins corresponding to an at least one-dimensional position relative to the transmitter.

7. The method according to claim 1, wherein the processing device performs a complex phase demodulation on the slow-time signal of each position bin to retrieve a single-bin displacement signal for the respective position bin.

8. The method according to claim 1, wherein the adaptive Nonlinear Least Squares method is based on minimization of a difference between the aggregate displacement signal and a model function with a plurality of harmonics for each of at least one oscillating motion.

9. The method according to claim 1, wherein the processing device calculates at least one frequency of one oscillating motion using a cost function that is based on a Fast Fourier Transformation of the aggregate displacement signal.

10. The method according to claim 1, wherein the processing device uses a Kalman filter to determine the first estimated fundamental frequency.

11. The method according to claim 1, wherein the processing device uses an estimated fundamental frequency calculated in one processing window to define a search region for a frequency in a later processing window.

12. The method according to claim 1, wherein the processing device calculates, for at least one processing window, a predicted state comprising a predicted fundamental frequency that is based on at least one previous processing window, and selects one frequency estimate as the estimated fundamental frequency depending on a comparison between the predicted fundamental frequency and the frequency estimate.

13. A radar sensor system for life sign monitoring, comprising:
a transmitter for irradiating at least one body region of an object with radar radiation;
a receiver for generating a receiver signal from reflected radiation from the at least one body region; and
a processing device adapted to combine single-bin displacement signals from a plurality of position bins, depending on a correlation of these single-bin displacement signals, to obtain an aggregate displacement signal, to generate, for each of a plurality of processing windows that represent time intervals, a displacement signal based on the receiver signal, which displacement signal characterizes a body motion comprising as oscillating motions a breathing motion and a heartbeat motion, and to calculate an estimated fundamental frequency for at least one oscillating motion,
wherein the processing device is adapted to apply, based on the displacement signal, an adaptive Nonlinear Least Squares method to calculate a plurality of frequency estimates, each of which corresponds to one of a plurality of harmonics of a first oscillating motion, wherein the processing device is adapted to use an individual search region for each frequency estimate, to adapt at least one search region for at least one processing window, and to calculate a first estimated fundamental frequency for the first oscillating motion based on the frequency estimates.

* * * * *